(12) United States Patent
Chen

(10) Patent No.: US 9,510,303 B2
(45) Date of Patent: Nov. 29, 2016

(54) METHOD FOR CONTROLLING TRANSMIT POWER IN MULTICHANNEL SYSTEM, RECEIVE END, AND TRANSMIT END

(71) Applicant: Huawei Technologies Co., Ltd., Shenzhen, Guangdong (CN)

(72) Inventor: Zihuan Chen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/048,305

(22) Filed: Feb. 19, 2016

(65) Prior Publication Data

US 2016/0174171 A1 Jun. 16, 2016

Related U.S. Application Data

(63) Continuation of application No. PCT/CN2013/081850, filed on Aug. 20, 2013.

(51) Int. Cl.
*H04B 7/00* (2006.01)
*H04W 52/34* (2009.01)
*H04W 52/04* (2009.01)
*H04W 52/42* (2009.01)
*H04W 52/24* (2009.01)
(Continued)

(52) U.S. Cl.
CPC ........ *H04W 52/346* (2013.01); *H04L 25/0204* (2013.01); *H04W 52/04* (2013.01); *H04W 52/245* (2013.01); *H04W 52/42* (2013.01); *H04B 7/0456* (2013.01); *H04B 7/0617* (2013.01); *H04B 7/0619* (2013.01); *H04W 52/08* (2013.01); *Y02B 60/50* (2013.01)

(58) Field of Classification Search
None
See application file for complete search history.

(56) References Cited

U.S. PATENT DOCUMENTS 5,537,443 A * 7/1996 Yoshino ................. H04B 1/123 375/340
7,652,981 B2 * 1/2010 Tomisato ............ H04L 27/2614 370/210

(Continued)

FOREIGN PATENT DOCUMENTS

CN 101478815 A 7/2009
CN 102098772 A 6/2011
(Continued)

*Primary Examiner* — Dominic Rego

(57) ABSTRACT

The present invention discloses a method. The method includes: receiving, through N receive channels, N signals sent by a transmit end, where the N signals include a channel estimation sequence; determining a total receive power of an $i^{th}$ receive channel; determining a channel matrix according to a received channel estimation sequence; determining a useful receive power of the $i^{th}$ receive channel according to the channel matrix and the total receive power of the $i^{th}$ receive channel; determining, according to the channel matrix and a receive power that is required by single-channel communication, a receive power required by the $i^{th}$ receive channel; and sending a power adjustment message to the transmit end if the useful receive power of the $i^{th}$ receive channel does not match the receive power required by the $i^{th}$ receive channel, so that the transmit end adjusts a transmit power of an $i^{th}$ signal.

18 Claims, 6 Drawing Sheets

(51) Int. Cl.
  *H04L 25/02* (2006.01)
  *H04B 7/04* (2006.01)
  *H04B 7/06* (2006.01)
  *H04W 52/08* (2009.01)

(56) References Cited

U.S. PATENT DOCUMENTS

2003/0174767 A1* 9/2003 Fujii ............... H04B 7/005
                                                    375/229
2005/0250466 A1* 11/2005 Varma ............... H04B 1/1027
                                                    455/296
2008/0009321 A1* 1/2008 Sayeed ............... H01Q 3/2605
                                                    455/562.1
2010/0151804 A1 6/2010 Song et al.

FOREIGN PATENT DOCUMENTS

CN 103179652 A 6/2013
CN 103220769 A 7/2013
EP 1 517 455 A1 3/2005

* cited by examiner

S160

```
┌─────────────────────────────────────────────────────────┐
│ Send the power adjustment message to the transmit end if the │
│ useful receive power of the $i^{th}$ receive channel is less than the │
│   receive power required by the $i^{th}$ receive channel, where the   │
│   power adjustment message carries a request for increasing a    │── S161
│ transmit power, so that the transmit end increases the transmit  │
│    power of the $i^{th}$ signal according to the request for increasing    │
│                        a transmit power                        │
└─────────────────────────────────────────────────────────┘
                              │
┌─────────────────────────────────────────────────────────┐
│ Send the power adjustment message to the transmit end if the │
│ useful receive power of the $i^{th}$ receive channel is greater than │
│    the receive power required by the $i^{th}$ receive channel,    │
│ the power adjustment message carries a request for reducing a │── S162
│  transmit power, so that the transmit end reduces the transmit │
│    power of the $i^{th}$ signal according to the request for reducing a    │
│                        transmit power                        │
└─────────────────────────────────────────────────────────┘
```

| Send $N$ signals to a receive end through $N$ transmit channels, where an $i^{th}$ signal in the $N$ signals is sent on an $i^{th}$ transmit channel in the $N$ transmit channels, and each signal in the $N$ signals includes a channel estimation sequence, so that the receive end determines a total receive power of an $i^{th}$ receive channel in $N$ receive channels, and determines a channel matrix H according to a received channel estimation sequence | ⟳ S410 |

↓

| Receive a power adjustment message that is sent by the receive end when a useful receive power of the $i^{th}$ receive channel does not match a receive power required by the $i^{th}$ receive channel, where the useful receive power of the $i^{th}$ receive channel is determined by the receive end according to the channel matrix H and the total receive power of the $i^{th}$ receive channel, the useful receive power of the $i^{th}$ receive channel indicates a receive power, which is occupied by the $i^{th}$ signal, in the total receive power of the $i^{th}$ receive channel, and the receive power required by the $i^{th}$ receive channel is determined by the receive end according to the channel matrix H and a receive power that is required by single-channel communication | ⟳ S420 |

↓

| Adjust a transmit power of the $i^{th}$ signal according to the power adjustment message | ⟳ S430 |

If the power adjustment message carries a request for increasing a transmit power, increase the transmit power of the $i^{th}$ signal according to the request for increasing a transmit power, where the power adjustment message is sent by the transmit end when the useful receive power of the $i^{th}$ receive channel is less than the receive power required by the $i^{th}$ receive channel ⸺ S431

If the power adjustment message carries a request for reducing a transmit power, reduce the transmit power of the $i^{th}$ signal according to the request for reducing a transmit power, where the power adjustment message is sent by the transmit end when the useful receive power of the $i^{th}$ receive channel is greater than the receive power required by the $i^{th}$ receive channel ⸺ S432

FIG. 5

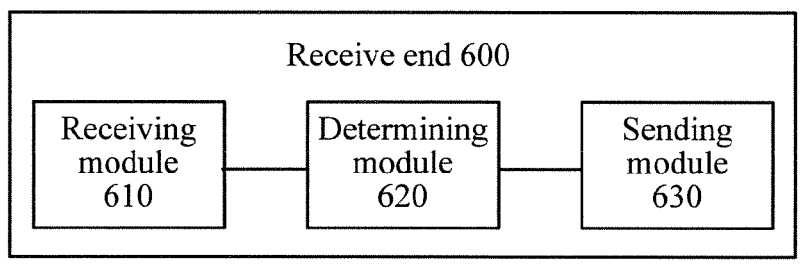

FIG. 6

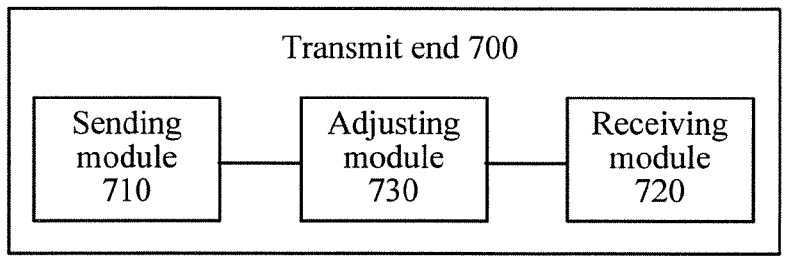

FIG. 7

METHOD FOR CONTROLLING TRANSMIT POWER IN MULTICHANNEL SYSTEM, RECEIVE END, AND TRANSMIT END

CROSS-REFERENCE TO RELATED APPLICATIONS

This application is a continuation of International Application No. PCT/CN2013/081850, filed on Aug. 20, 2013, which is hereby incorporated by reference in its entirety.

TECHNICAL FIELD

The present invention relates to the field of communications, and in particular, to a method for controlling a transmit power in a multichannel system, a receive end, and a transmit end.

BACKGROUND

Fiber transmission is very mature on both a technical level and a network application level; however, because of limitations such as landforms and topography, a wireless manner needs to be used for transmission in many places, and a microwave transmission manner is generally used in a case in which a large bandwidth is required. Currently, in applications in markets such as base station backhaul transmission of a mobile cellular system, networking between a transmission network and a metropolitan area network, a digital relay transmission network of a broadcast and television network, a dedicated network (such as a power network, or a military network) and large enterprise access, microwave transmission is widely applied.

In a microwave transmission communications system, frequently-used frequency bands are 1.4 GHz to 2.7 GHz, 3 GHz to 11 GHz, 23 GHz to 55 GHz and the like, a channel bandwidth is 0.025 MHz to 56 MHz, and a transmission rate may reach hundreds of Mbps.

With increases in service requirements, a microwave transmission system needs to develop towards higher-speed transmission communication. Spectrum resources of frequently-used frequency bands are limited, and therefore, if data needs to be transmitted at Gbps, multichannel communication, for example, a technology such as polarization multiplexing or multiple-input multiple-output (Multiple-input Multiple-output, MIMO), is a main development direction of microwave in the future.

In a microwave communications system, the impact of fading variation on system performance is usually reduced by controlling a transmit power. In an emerging multichannel communications system in the field of microwave communication, the foregoing problem also needs to be considered to reduce the impact of fading variation.

An Automatic Transmit Power Control (Automatic Transmit Power Control, ATPC) technology is widely applied in digital microwave communication. A key point of the technology is that an output power of a microwave transmitter varies automatically within a control range of the ATPC by tracing a variation of a receive level at a receive end. In a normal propagation condition, the output power of the transmitter is fixed at a relatively low level, for example, a level lower than a normal level by 10 dB to 15 dB. When propagation fading occurs and a receiver detects the propagation fading, a peer transmitter is immediately controlled by using a microwave band overhead byte, to increase a transmit power. The technology may desirably solve a problem such as fading variation in single-channel communication.

For a microwave multichannel system, a receive signal is usually susceptible to in-band interference from another transmit antenna, and an actually useful receive power cannot be accurately acquired. Therefore, the problem such as the impact of fading variation in the multichannel system cannot be solved by using the existing ATPC technology.

SUMMARY

Embodiments of the present invention provide a method for controlling a transmit power in a multichannel system, a receive end, and a transmit end, which can reduce the impact of fading variation in a multichannel system.

According to a first aspect, a method for controlling a transmit power in a multichannel system is provided, including: receiving, through N receive channels, N signals sent by a transmit end, where an $i^{th}$ signal in the N signals is sent on an $i^{th}$ transmit channel in N transmit channels by the transmit end, each signal in the N signals includes a channel estimation sequence, N is a positive integer, N≥2, and i=1, 2, ..., N; determining a total receive power of an $i^{th}$ receive channel in the N receive channels; determining a channel matrix H according to a received channel estimation sequence; determining a useful receive power of the $i^{th}$ receive channel according to the channel matrix H and the total receive power of the $i^{th}$ receive channel, where the useful receive power of the $i^{th}$ receive channel indicates a receive power, which is occupied by the $i^{th}$ signal, in the total receive power of the $i^{th}$ receive channel; determining, according to the channel matrix H and a receive power that is required by single-channel communication, a receive power required by the $i^{th}$ receive channel; and sending a power adjustment message to the transmit end if the useful receive power of the $i^{th}$ receive channel does not match the receive power required by the $i^{th}$ receive channel, so that the transmit end adjusts a transmit power of the $i^{th}$ signal according to the power adjustment message.

In a first possible implementation manner, the sending a power adjustment message to the transmit end if the useful receive power of the $i^{th}$ receive channel does not match the receive power required by the $i^{th}$ receive channel includes: sending the power adjustment message to the transmit end if the useful receive power of the $i^{th}$ receive channel is less than the receive power required by the $i^{th}$ receive channel, where the power adjustment message carries a request for increasing a transmit power, so that the transmit end increases the transmit power of the $i^{th}$ signal according to the request for increasing a transmit power; or sending the power adjustment message to the transmit end if the useful receive power of the $i^{th}$ receive channel is greater than the receive power required by the $i^{th}$ receive channel, where the power adjustment message carries a request for reducing a transmit power, so that the transmit end reduces the transmit power of the $i^{th}$ signal according to the request for reducing a transmit power.

With reference to the first aspect or the first possible implementation manner of the first aspect, in a second possible implementation manner, the method further includes: skipping sending the power adjustment message to the transmit end if the useful receive power of the $i^{th}$ receive channel matches the receive power required by the $i^{th}$ receive channel.

With reference to the first aspect or the first or second possible implementation manner of the first aspect, in a third possible implementation manner, the determining a useful receive power of the $i^{th}$ receive channel according to the channel matrix H and the total receive power of the $i^{th}$ receive channel includes: determining the useful receive power $P_{rx}^{i}(t)$ of the $i^{th}$ receive channel according to the following equation: $P_{rx}^{i}(t)=P_{total}^{i}(t)\cdot R_i$, where $P_{total}^{i}(t)$ represents the total receive power of the $i^{th}$ receive channel, $R_i$ represents a proportion of the $i^{th}$ signal to a receive signal of the $i^{th}$ receive channel, and $$R_i = \frac{|h_{ii}|^2}{\sum_{j=1}^{N}|h_{ij}|^2},$$

where $h_{ii}$ and $h_{ij}$ are corresponding elements in the channel matrix H, and $$H = \begin{bmatrix} h_{11} & h_{12} & \ldots & h_{1N} \\ h_{21} & h_{22} & \ldots & h_{2N} \\ \ldots & \ldots & \ldots & \ldots \\ h_{N1} & h_{N2} & \ldots & h_{NN} \end{bmatrix}.$$

With reference to the first aspect or any possible implementation manner of the first to third possible implementation manners of the first aspect, in a fourth possible implementation manner, the determining, according to the channel matrix H and a receive power that is required by single-channel communication, a receive power required by the $i^{th}$ receive channel includes: determining a condition number cond $(H)_{of}$ the channel matrix H according to the channel matrix H; determining a required power margin $P_M$ corresponding to the condition number cond(H) of the channel matrix H; and determining, according to the following equation, the receive power $P_{thr}$ required by the $i^{th}$ receive channel: $P_{thr}=P_{SISO}+P_M$, where $P_{SISO}$ represents the receive power required by the single-channel communication.

According to a second aspect, a method for controlling a transmit power in a multichannel system is provided, including: sending N signals to a receive end through N transmit channels, where an $i^{th}$ signal in the N signals is sent on an $i^{th}$ transmit channel in the N transmit channels, and each signal in the N signals includes a channel estimation sequence, so that the receive end determines a total receive power of an $i^{th}$ receive channel in N receive channels, and determines a channel matrix H according to a received channel estimation sequence, where N is a positive integer, N≥2, and i=1, 2, . . . , N; receiving a power adjustment message that is sent by the receive end when a useful receive power of the $i^{th}$ receive channel does not match a receive power required by the $i^{th}$ receive channel, where the useful receive power of the $i^{th}$ receive channel is determined by the receive end according to the channel matrix H and the total receive power of the $i^{th}$ receive channel, the useful receive power of the $i^{th}$ receive channel indicates a receive power, which is occupied by the $i^{th}$ signal, in the total receive power of the $i^{th}$ receive channel, and the receive power required by the $i^{th}$ receive channel is determined by the receive end according to the channel matrix H and a receive power that is required by single-channel communication; and adjusting a transmit power of the $i^{th}$ signal according to the power adjustment message.

In a first possible implementation manner, the adjusting a transmit power of the $i^{th}$ signal according to the power adjustment message includes: if the power adjustment message carries a request for increasing a transmit power, increasing the transmit power of the $i^{th}$ signal according to the request for increasing a transmit power, where the power adjustment message is sent by the receive end when the useful receive power of the $i^{th}$ receive channel is less than the receive power required by the $i^{th}$ receive channel; or if the power adjustment message carries a request for reducing a transmit power, reducing the transmit power of the $i^{th}$ signal according to the request for reducing a transmit power, where the power adjustment message is sent by the receive end when the useful receive power of the $i^{th}$ receive channel is greater than the receive power required by the $i^{th}$ receive channel.

With reference to the second aspect or the first possible implementation manner of the second aspect, in a second possible implementation manner, the useful receive power of the $i^{th}$ receive channel is determined by the receive end according to the following equation: $P_{rx}^{i}(t)=P_{total}^{i}(t)\cdot R_i$, where $P_{rx}^{i}(t)$ represents the useful receive power of the $i^{th}$ receive channel, $P_{total}^{i}(t)$ represents the total receive power of the $i^{th}$ receive channel, $R_i$ represents a proportion of the $i^{th}$ signal to a receive signal of the $i^{th}$ receive channel, and $$R_i = \frac{|h_{ii}|^2}{\sum_{j=1}^{N}|h_{ij}|^2},$$

where $h_{ii}$ and $h_{ij}$ are corresponding elements in the channel matrix H, and $$H = \begin{bmatrix} h_{11} & h_{12} & \ldots & h_{1N} \\ h_{21} & h_{22} & \ldots & h_{2N} \\ \ldots & \ldots & \ldots & \ldots \\ h_{N1} & h_{N2} & \ldots & h_{NN} \end{bmatrix}.$$

With reference to the second aspect or the first or second possible implementation manner of the second aspect, in a third possible implementation manner, the receive power required by the $i^{th}$ receive channel is determined by the receive end according to the following equation: $P_{thr}=P_{SISO}+P_M$, where $P_{thr}$ represents the receive power required by the $i^{th}$ receive channel, $P_{SISO}$ represents the receive power required by the single-channel communication, and $P_M$ represents a required power margin corresponding to a condition number cond(H) of the channel matrix H.

According to a third aspect, a receive end is provided, including: a receiving module, configured to receive, through N receive channels, N signals sent by a transmit end, where an $i^{th}$ signal in the N signals is sent on an $i^{th}$ transmit channel in N transmit channels by the transmit end, each signal in the N signals includes a channel estimation sequence, N is a positive integer, N≥2, and i=1, 2, . . . , N; a determining module, configured to determine a total receive power of an $i^{th}$ receive channel in the N receive channels, determine a channel matrix H according to a received channel estimation sequence, determine a useful receive power of the $i^{th}$ receive channel according to the channel matrix H and the total receive power of the $i^{th}$ receive channel, where the useful receive power of the $i^{th}$ receive channel indicates a receive power, which is occupied by the $i^{th}$ signal, in the total receive power of the $i^{th}$ receive channel, and determine, according to the channel matrix H and a receive power that is required by single-channel communication, a receive power required by the $i^{th}$ receive channel; and a sending module, configured to send a power adjustment message to the transmit end when the useful receive power of the $i^{th}$ receive channel does not match the receive power required by the $i^{th}$ receive channel, so that the transmit end adjusts a transmit power of the $i^{th}$ signal according to the power adjustment message.

In a first possible implementation manner, the sending module is specifically configured to send the power adjustment message to the transmit end when the useful receive power of the $i^{th}$ receive channel is less than the receive power required by the $i^{th}$ receive channel, where the power adjustment message carries a request for increasing a transmit power, so that the transmit end increases the transmit power of the $i^{th}$ signal according to the request for increasing a transmit power; or send the power adjustment message to the transmit end when the useful receive power of the $i^{th}$ receive channel is greater than the receive power required by the $i^{th}$ receive channel, where the power adjustment message carries a request for reducing a transmit power, so that the transmit end reduces the transmit power of the $i^{th}$ signal according to the request for reducing a transmit power.

With reference to the third aspect or the first possible implementation manner of the third aspect, in a second possible implementation manner, the sending module is further configured to skip sending the power adjustment message to the transmit end when the useful receive power of the $i^{th}$ receive channel matches the receive power required by the $i^{th}$ receive channel.

With reference to the third aspect or the first or second possible implementation manner of the third aspect, in a third possible implementation manner, the determining module is specifically configured to determine the useful receive power $P_{rx}^{i}(t)$ of the $i^{th}$ receive channel according to the following equation: $P_{rx}^{i}(t)=P_{total}^{i}(t)\cdot R_i$, where $P_{total}^{i}(t)$ represents the total receive power of the $i^{th}$ receive channel, $R_i$ represents a proportion of the $i^{th}$ signal to a receive signal of the $i^{th}$ receive channel, and $$R_i = \frac{|h_{ii}|^2}{\sum_{j=1}^{N} |h_{ij}|^2},$$

where $h_{ii}$ and $h_{ij}$ are corresponding elements in the channel matrix H, and $$H = \begin{bmatrix} h_{11} & h_{12} & \ldots & h_{1N} \\ h_{21} & h_{22} & \ldots & h_{2N} \\ \ldots & \ldots & \ldots & \ldots \\ h_{N1} & h_{N2} & \ldots & h_{NN} \end{bmatrix}.$$

With reference to the third aspect or any possible implementation manner of first to third possible implementation manners of the third aspect, in a fourth possible implementation manner, the determining module is specifically configured to determine a condition number cond(H) of the channel matrix H according to the channel matrix H, determine a required power margin $P_M$ corresponding to the condition number cond(H) of the channel matrix H, and determine, according to the following equation, the receive power $P_{thr}$ required by the $i^{th}$ receive channel: $P_{thr}=P_{SISO}+P_M$, where $P_{SISO}$ represents the receive power required by the single-channel communication.

According to a fourth aspect, a transmit end is provided, including: a sending module, configured to send N signals to a receive end through N transmit channels, where an $i^{th}$ signal in the N signals is sent on an $i^{th}$ transmit channel in the N transmit channels, and each signal in the N signals includes a channel estimation sequence, so that the receive end determines a total receive power of an $i^{th}$ receive channel in N receive channels, and determines a channel matrix H according to a received channel estimation sequence, where N is a positive integer, N≥2, and i=1, 2, . . . , N; a receiving module, configured to receive a power adjustment message that is sent by the receive end when a useful receive power of the $i^{th}$ receive channel does not match a receive power required by the $i^{th}$ receive channel, where the useful receive power of the $i^{th}$ receive channel is determined by the receive end according to the channel matrix H and the total receive power of the $i^{th}$ receive channel, the useful receive power of the $i^{th}$ receive channel indicates a receive power, which is occupied by the $i^{th}$ signal, in the total receive power of the $i^{th}$ receive channel, and the receive power required by the $i^{th}$ receive channel is determined by the receive end according to the channel matrix H and a receive power that is required by single-channel communication; and an adjusting module, configured to adjust a transmit power of the $i^{th}$ signal according to the power adjustment message.

In a first possible implementation manner, the adjusting module is specifically configured to: if the power adjustment message carries a request for increasing a transmit power, increase the transmit power of the $i^{th}$ signal according to the request for increasing a transmit power, where the power adjustment message is sent by the receive end when the useful receive power of the $i^{th}$ receive channel is less than the receive power required by the $i^{th}$ receive channel; or if the power adjustment message carries a request for reducing a transmit power, reduce the transmit power of the $i^{th}$ signal according to the request for reducing a transmit power, where the power adjustment message is sent by the receive end when the useful receive power of the $i^{th}$ receive channel is greater than the receive power required by the $i^{th}$ receive channel.

With reference to the fourth aspect or the first possible implementation manner of the fourth aspect, in a second possible implementation manner, the useful receive power of the $i^{th}$ receive channel is determined by the receive end according to the following equation: $P_{rx}^{i}(t)=P_{total}^{i}(t)\cdot R_i$, where $P_{rx}^{i}(t)$ represents the useful receive power of the $i^{th}$ receive channel, $P_{total}^{i}(t)$ represents the total receive power of the $i^{th}$ receive channel, $R_i$ represents a proportion of the $i^{th}$ signal to a receive signal of the $i^{th}$ receive channel, and $$R_i = \frac{|h_{ii}|^2}{\sum_{j=1}^{N} |h_{ij}|^2},$$

where $h_{ii}$ and $h_{ij}$ are corresponding elements in the channel matrix H, and $$H = \begin{bmatrix} h_{11} & h_{12} & \ldots & h_{1N} \\ h_{21} & h_{22} & \ldots & h_{2N} \\ \ldots & \ldots & \ldots & \ldots \\ h_{N1} & h_{N2} & \ldots & h_{NN} \end{bmatrix}.$$

With reference to the fourth aspect or the first or second possible implementation manner of the fourth aspect, in a third possible implementation manner, the receive power required by the $i^{th}$ receive channel is determined by the receive end according to the following equation: $P_{thr}=P_{SISO}+P_M$, where $P_{thr}$ represents the receive power required by the $i^{th}$ receive channel, $P_{SISO}$ represents the receive power required by the single-channel communication, and $P_M$ represents a required power margin corresponding to a condition number cond(H) of the channel matrix H.

Based on the foregoing technical solutions, in the embodiments of the present invention, a useful receive power of an $i^{th}$ receive channel is determined according to a channel matrix, and a power adjustment message to be sent to a transmit end is determined according to the useful receive power of the $i^{th}$ receive channel, so that a receive power requirement of a useful signal can be met, and the impact of fading variation in a multichannel system on system performance can be reduced.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 2 is a schematic flowchart of a method for sending a power adjustment message according to an embodiment of the present invention;

FIG. 4 is a schematic flowchart of a method for controlling a transmit power in a multichannel system according to another embodiment of the present invention;

FIG. 5 is a schematic flowchart of a method for adjusting a transmit power according to an embodiment of the present invention;

FIG. 6 is a schematic block diagram of a receive end according to an embodiment of the present invention;

FIG. 7 is a schematic block diagram of a transmit end according to an embodiment of the present invention;

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions in the embodiments of the present invention may be applied to various multichannel systems, for example, a multichannel communications system that uses technologies such as polarization multiplexing and MIMO.

Figure 1:
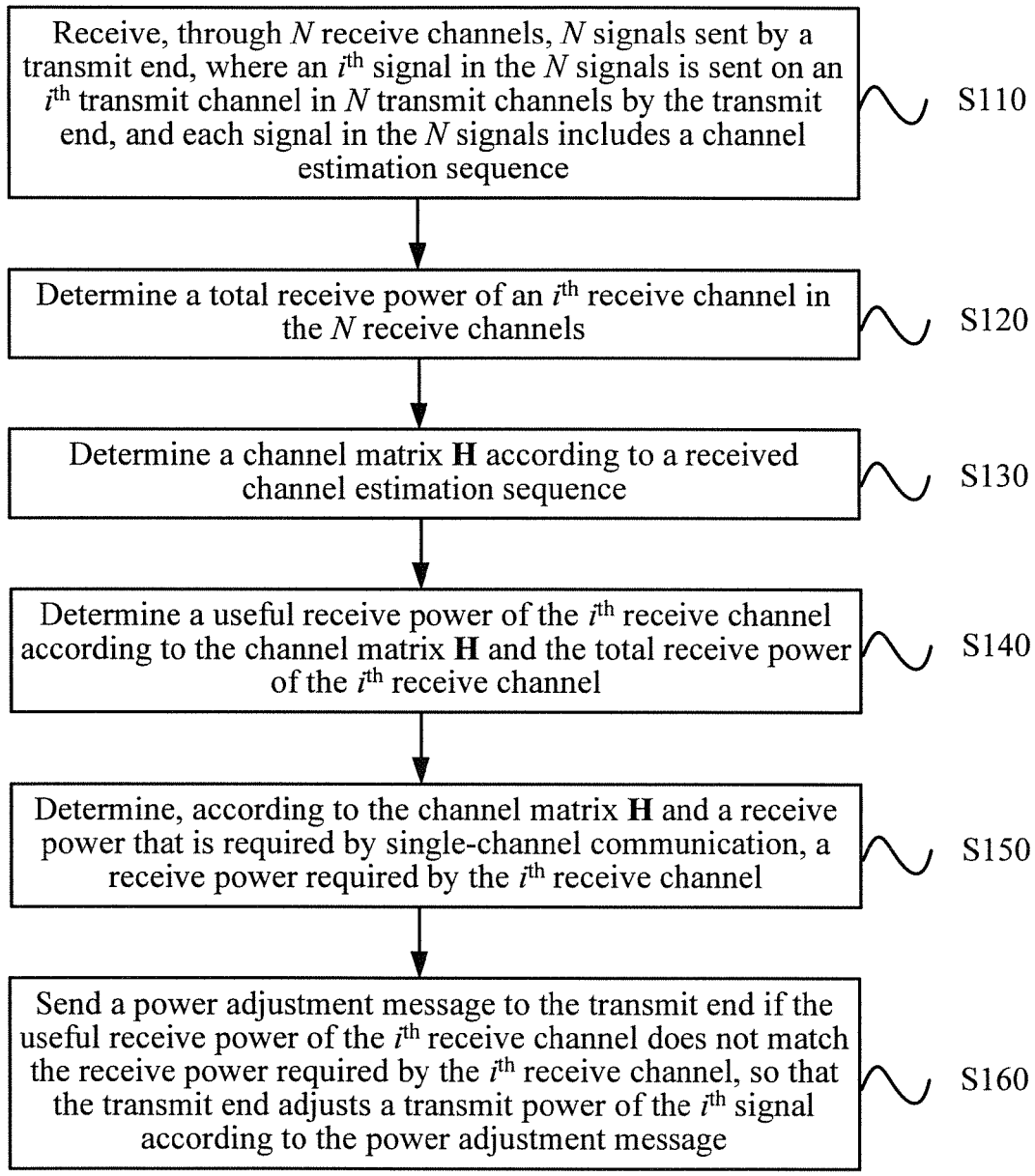
FIG. 1 is a schematic flowchart of a method for controlling a transmit power in a multichannel system according to an embodiment of the present invention.

FIG. 1 is a schematic flowchart of a method 100 for controlling a transmit power in a multichannel system according to an embodiment of the present invention. The method shown in FIG. 1 is executed by a receive end. As shown in FIG. 1, the method 100 includes:

S110: Receive, through N receive channels, N signals sent by a transmit end, where an $i^{th}$ signal in the N signals is sent on an $i^{th}$ transmit channel in N transmit channels by the transmit end, each signal in the N signals includes a channel estimation sequence, N is a positive integer, N≥2, and i=1, 2, ..., N.

S120: Determine a total receive power of an $i^{th}$ receive channel in the N receive channels.

S130: Determine a channel matrix H according to a received channel estimation sequence.

S140: Determine a useful receive power of the $i^{th}$ receive channel according to the channel matrix H and the total receive power of the $i^{th}$ receive channel, where the useful receive power of the $i^{th}$ receive channel indicates a receive power, which is occupied by the $i^{th}$ signal, in the total receive power of the $i^{th}$ receive channel.

S150: Determine, according to the channel matrix H and a receive power that is required by single-channel communication, a receive power required by the $i^{th}$ receive channel.

S160: Send a power adjustment message to the transmit end if the useful receive power of the $i^{th}$ receive channel does not match the receive power required by the $i^{th}$ receive channel, so that the transmit end adjusts a transmit power of the $i^{th}$ signal according to the power adjustment message.

In a multichannel system, a transmit end sends N signals to a receive end through N transmit channels, where an $i^{th}$ signal in the N signals is sent on an $i^{th}$ transmit channel in the N transmit channels, and each signal in the N signals includes a channel estimation sequence. The receive end receives, through N receive channels, the N signals sent by the transmit end, and determines a total receive power of an $i^{th}$ receive channel in the N receive channels, that is, a receive power of a receive signal of the $i^{th}$ receive channel. A receive signal in the multichannel system is subject to in-band interference from another transmit antenna, and therefore, the total receive power of the $i^{th}$ receive channel is not a receive power of a useful signal (that is, an $i^{th}$ signal) in the receive signal of the $i^{th}$ receive channel. To determine a receive power (that is, a useful receive power of the $i^{th}$ receive channel), which is occupied by the $i^{th}$ signal, in the total receive power of the $i^{th}$ receive channel, the receive end determines a channel matrix H according to a received channel estimation sequence, and then determines the useful receive power of the $i^{th}$ receive channel according to the channel matrix H and the total receive power of the $i^{th}$ receive channel. On the other hand, the receive end determines, according to the channel matrix H and a receive power that is required by single-channel communication, a receive power required by the $i^{th}$ receive channel. Then, the receive end determines, according to the useful receive power of the $i^{th}$ receive channel and the receive power that is required by the $i^{th}$ receive channel, whether to send a power adjustment message to the transmit end. If the useful receive power of the $i^{th}$ receive channel does not match the receive power required by the $i^{th}$ receive channel, the receive end sends the power adjustment message to the transmit end. The transmit end adjusts a transmit power of the $i^{th}$ signal according to the power adjustment message. The power adjustment message is determined according to the useful receive power of the $i^{th}$ receive channel, and therefore a receive power requirement of a useful signal can be met by adjusting a power according to the power adjustment message, and the impact of fading variation in the multichannel system on system performance can be reduced.

According to the method for controlling a transmit power in a multichannel system in this embodiment of the present invention, a useful receive power of an $i^{th}$ receive channel is determined according to a channel matrix, and a power adjustment message to be sent to a transmit end is determined according to the useful receive power of the $i^{th}$ receive channel, so that a receive power requirement of a useful signal can be met, and the impact of fading variation in a multichannel system on system performance can be reduced.

In S110, the receive end receives, through the N receive channels, the N signals sent by the transmit end, where each signal in the N signals includes a channel estimation sequence.

The transmit end sends the N signals at an initial transmit power through the N transmit channels, the $i^{th}$ signal is sent on the $i^{th}$ transmit channel, and a channel estimation sequence is inserted in an air interface frame structure of each signal, where the channel estimation sequence is used for channel estimation.

A 4×4 MIMO microwave communications system is used as an example. The transmit end sends four signals at an initial transmit power, and an air interface frame of each signal includes a MIMO channel estimation sequence.

In S120, the receive end determines the total receive power of the $i^{th}$ receive channel in the N receive channels.

The receive end determines a total receive power of each receive channel (for ease of description, the $i^{th}$ receive channel is used as an example for description in this embodiment of the present invention) in the N receive channels. For example, the total receive power of the $i^{th}$ receive channel may be acquired by using a radio frequency front end. The receive signal in the multichannel system is subject to in-band interference from another transmit antenna, and therefore, the total receive power of the $i^{th}$ receive channel is not the useful receive power of the $i^{th}$ receive channel. That is, by means of direct power adjustment according to the total receive power of the $i^{th}$ receive channel, the receive power of the useful signal (that is, the $i^{th}$ signal) of the $i^{th}$ receive channel cannot be ensured, and the impact of fading variation on a system cannot be accurately reduced. Therefore, in this embodiment of the present invention, the useful receive power of the $i^{th}$ receive channel is determined subsequently.

In S130, the receive end determines the channel matrix H according to the received channel estimation sequence.

The channel matrix H includes a main channel and an interference channel. The channel matrix H is expressed as:

$$H = \begin{bmatrix} h_{11} & h_{12} & \ldots & h_{1N} \\ h_{21} & h_{22} & \ldots & h_{2N} \\ \ldots & \ldots & \ldots & \ldots \\ h_{N1} & h_{N2} & \ldots & h_{NN} \end{bmatrix} \quad (1)$$

where $h_{ii}$ is an $i^{th}$ main channel, and $h_{ij}$ (j=1, 2, ..., N) is a channel of interference caused by a $j^{th}$ signal to the $i^{th}$ signal when j≠i.

A 4×4 MIMO microwave communications system is used as an example. The channel matrix H is expressed as:

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \quad (2)$$

The receive end performs channel estimation according to the received channel estimation sequence, to determine the channel matrix H.

A channel estimation technology includes a time domain and a frequency domain. In both the time domain and the frequency domain, channel estimation sequences sent by a transmit end are mutually independent or orthogonal (time domain/frequency domain is independent or orthogonal). Assuming that the sent channel estimation sequences are sequentially $s_1$, $s_2$, $s_3$, and $s_4$, each two of which are orthogonal. A channel estimation sequence received on a corresponding first receive channel is:

$$y_1 = h_{11}*s_1 + h_{12}*s_2 + h_{13}*s_3 + h_{14}*s_4,$$

it is calculated that cross-correlation of $y_1$ and $s_1$ is:

$$Ry_1s_1 = h_{11}*Rs_1s_1 + h_{12}*Rs_2s_1 + h_{13}Rs_3s_1 + h_{14}*Rs_4s_1,$$

because each two of the sent channel estimation sequences are orthogonal, that is, $Rs_2s_1=0$, $Rs_3s_1=0$, and $Rs_4s_1=0$, it is obtained that the channel $h_{11}=Ry_1s_1/Rs_1s_1$, and because $s_1$ is a known sequence, $Ry_1s_1$ and $Rs_1s_1$ may be obtained, and then $h_{11}$ may be obtained.

Similarly, $h_{12}$ may be obtained according to cross-correlation of $y_1$ and $s_2$ and autocorrelation of $s_2$, and by analogy, the channel matrix H may be obtained.

In S140, the receive end determines the useful receive power of the $i^{th}$ receive channel according to the channel matrix H and the total receive power of the $i^{th}$ receive channel.

In this embodiment of the present invention, the useful receive power of the $i^{th}$ receive channel indicates the receive power, which is occupied by the $i^{th}$ signal, in the total receive power of the $i^{th}$ receive channel.

Optionally, S140 includes:

determining the useful receive power $P_{rx}^i(t)$ of the $i^{th}$ receive channel according to the following equation:

$$P_{rx}^i(t) = P_{total}^i(t) \cdot R_i, \quad (3)$$

where $P_{total}^i(t)$ represents the total receive power of the $i^{th}$ receive channel, $R_i$ represents a proportion of the $i^{th}$ signal to the receive signal of the $i^{th}$ receive channel, and $$R_i = \frac{|h_{ii}|^2}{\sum_{j=1}^{N} |h_{ij}|^2}, \quad (4)$$

where $h_{ii}$ and $h_{ij}$ are corresponding elements in the channel matrix H.

That is, the useful receive power of the $i^{th}$ receive channel is a product of the total receive power of the $i^{th}$ receive channel and a proportion of a useful signal to the receive signal of the $i^{th}$ receive channel.

It should be understood that, the useful receive power of the $i^{th}$ receive channel may also be obtained by subtracting a receive power occupied by an interference signal in the receive signal of the $i^{th}$ receive channel from the total receive power of the $i^{th}$ receive channel. This implementation manner should also fall within the protection scope of the present invention.

In S150, the receive end determines, according to the channel matrix H and the receive power that is required by the single-channel communication, the receive power required by the $i^{th}$ receive channel.

In this embodiment of the present invention, the receive power required by the $i^{th}$ receive channel indicates a receive power required for accurately receiving the $i^{th}$ signal on the $i^{th}$ receive channel. The receive end determines, according to whether the useful receive power of the $i^{th}$ receive channel matches the receive power required by the $i^{th}$ receive channel, whether a power needs to be adjusted.

The receive power $P_{thr}$ required by the $i^{th}$ receive channel may be obtained by adding a required power margin $P_M$ to the receive power $P_{SISO}$ required by the single-channel communication. The receive power required by the single-channel communication may be $P_{SISO}$ preconfigured for the receive end. The required power margin $P_M$ corresponds to a condition number cond (H) of the channel matrix H.

That is, optionally, S150 includes:

determining the condition number cond(H) of the channel matrix H according to the channel matrix H;

determining the required power margin $P_M$ corresponding to the condition number cond(H) of the channel matrix H; and determining, according to the following equation, the receive power $P_{thr}$ required by the $i^{th}$ receive channel:

$$P_{thr} = P_{SISO} + P_M, \quad (5)$$

where $P_{SISO}$ represents the receive power required by the single-channel communication.

Specifically, the condition number of the channel matrix is equal to a result obtained by dividing a maximum eigenvalue of the channel matrix by a minimum eigenvalue. Performance of a multichannel communications system is related to a multichannel channel. If the condition number of the channel matrix is nearer to 1, it indicates that the channel is better and the system performance is higher; and if the condition number of the channel matrix is larger, it indicates that the channel is worse and the system performance is lower.

A correspondence table may be established in advance between a condition number of a channel matrix and a required power margin. The receive end obtains the condition number cond(H) of the channel matrix H by calculating an eigenvalue of the channel matrix H, obtains the required power margin $P_M$ corresponding to the condition number cond(H) of the channel matrix H by looking up the table, and then obtains, according to Equation (4), the receive power $P_{thr}$ required by the $i^{th}$ receive channel.

In S160, the receive end sends the power adjustment message to the transmit end if the useful receive power of the $i^{th}$ receive channel does not match the receive power required by the $i^{th}$ receive channel, so that the transmit end adjusts the transmit power of the $i^{th}$ signal according to the power adjustment message.

The receive end determines, according to whether the useful receive power of the $i^{th}$ receive channel matches the receive power required by the $i^{th}$ receive channel, whether to send the power adjustment message to the transmit end. When the useful receive power of the $i^{th}$ receive channel does not match the receive power required by the $i^{th}$ receive channel, the receive end sends the power adjustment message to the transmit end, so that the transmit end adjusts the transmit power of the $i^{th}$ signal according to the power adjustment message.

It should be understood that, in this embodiment of the present invention, matching of two powers may be that the two powers are equal or may be that a difference of the two powers is within a certain range. Similarly, mismatching of two powers may be that the two powers are not equal or may be that a difference of the two powers is beyond a certain range.

In this embodiment of the present invention, optionally, as shown in FIG. 2, S160 includes:

S161: send the power adjustment message to the transmit end if the useful receive power of the $i^{th}$ receive channel is less than the receive power required by the $i^{th}$ receive channel, where the power adjustment message carries a request for increasing a transmit power, so that the transmit end increases the transmit power of the $i^{th}$ signal according to the request for increasing a transmit power; or S162: send the power adjustment message to the transmit end if the useful receive power of the $i^{th}$ receive channel is greater than the receive power required by the $i^{th}$ receive channel, where the power adjustment message carries a request for reducing a transmit power, so that the transmit end reduces the transmit power of the $i^{th}$ signal according to the request for reducing a transmit power.

Specifically, when the useful receive power of the $i^{th}$ receive channel is less than the receive power required by the $i^{th}$ receive channel, the receive end sends, to the transmit end, the power adjustment message that carries the request for increasing a transmit power. The transmit end increases the transmit power of the $i^{th}$ signal according to the request for increasing a transmit power.

When the useful receive power of the $i^{th}$ receive channel is greater than the receive power required by the $i^{th}$ receive channel, the receive end sends, to the transmit end, the power adjustment message that carries the request for reducing a transmit power. The transmit end reduces the transmit power of the $i^{th}$ signal according to the request for reducing a transmit power.

Optionally, the transmit end may adjust (increase or reduce) the transmit power of the $i^{th}$ signal according to a certain step $\Delta P$, for example, according to the following equation:

$$P_{tx}^{i}(t+1) = P_{tx}^{i}(t) + \Delta P \quad (6)$$

When the transmit power is to be increased, $\Delta P$ is a positive value; and when the transmit power is to be reduced, $\Delta P$ is a negative value. The transmit end sends a signal according to an adjusted transmit power $P_{tx}^{i}(t+1)$.

The transmit end may also adjust the transmit power in another manner. For example, the power adjustment message sent by the receive end to the transmit end includes a value that needs to be adjusted (which may be a difference between $P_{rx}^{i}(t)$ and $P_{thr}$), and the transmit end adjusts the transmit power according to the value that needs to be adjusted. In this embodiment of the present invention, a manner for adjusting the transmit power by the transmit end is not limited.

Figure 3:
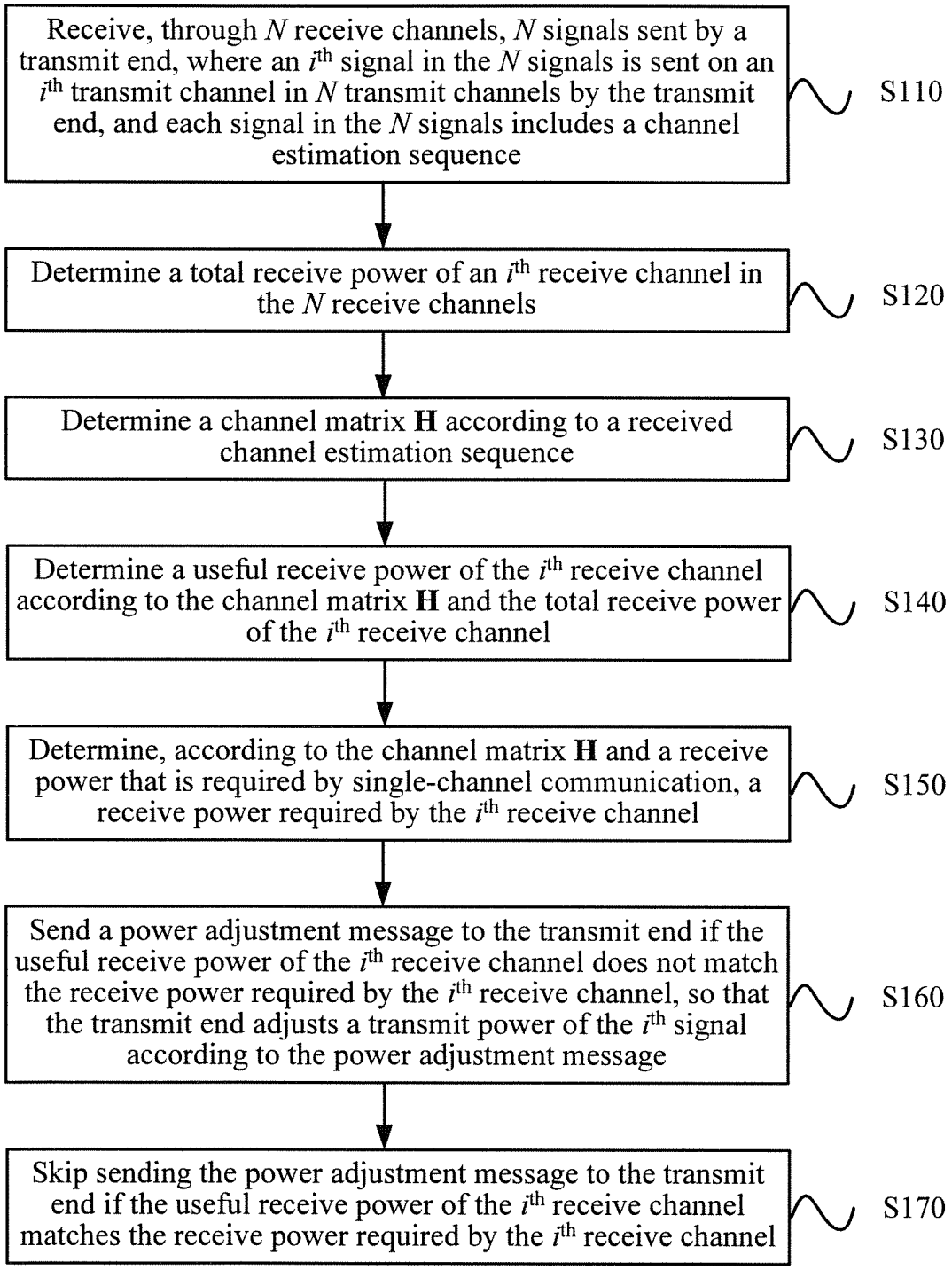
FIG. 3 is another schematic flowchart of a method for controlling a transmit power in a multichannel system according to an embodiment of the present invention.

In this embodiment of the present invention, optionally, as shown in FIG. 3, the method 100 further includes:

S170: Skip sending the power adjustment message to the transmit end if the useful receive power of the $i^{th}$ receive channel matches the receive power required by the $i^{th}$ receive channel.

When the useful receive power of the $i^{th}$ receive channel matches the receive power required by the $i^{th}$ receive channel, that is, when the useful receive power of the $i^{th}$ receive channel meets a requirement, the receive end does not send the power adjustment message to the transmit end.

If the transmit end adjusts the transmit power according to a certain step, the transmit end adjusts the transmit power according to the step as long as the power adjustment message sent by the receive end is received, and until the receive power meets the requirement, the receive end no longer sends the power adjustment message.

According to the method for controlling a transmit power in a multichannel system in this embodiment of the present invention, whether a power needs to be adjusted is determined according to a useful receive power, so that a receive power requirement of a useful signal can be met, the impact of fading variation in a multichannel system on system performance can be reduced, and interference with a neighboring system is reduced.

It should be understood that, the specific examples in this embodiment of the present invention are only to help a person skilled in the art better understand this embodiment of the present invention, rather than to limit the scope of this embodiment of the present invention.

The method for controlling a transmit power in a multichannel system according to the embodiments of the present invention is described above in detail from the perspective of a receive end, and a method for controlling a transmit power in a multichannel system according to the embodiments of the present invention is described in the following from the perspective of a transmit end.

FIG. 4 is a schematic flowchart of a method 400 for controlling a transmit power in a multichannel system according to an embodiment of the present invention. The method shown in FIG. 4 is executed by a transmit end. As shown in FIG. 4, the method 400 includes:

S410: Send N signals to a receive end through N transmit channels, where an $i^{th}$ signal in the N signals is sent on an $i^{th}$ transmit channel in the N transmit channels, and each signal in the N signals includes a channel estimation sequence, so that the receive end determines a total receive power of an $i^{th}$ receive channel in N receive channels, and determines a channel matrix H according to a received channel estimation sequence, where N is a positive integer, N≥2, and i=1, 2, . . . , N.

S420: Receive a power adjustment message that is sent by the receive end when a useful receive power of the $i^{th}$ receive channel does not match a receive power required by the $i^{th}$ receive channel, where the useful receive power of the $i^{th}$ receive channel is determined by the receive end according to the channel matrix H and the total receive power of the $i^{th}$ receive channel, the useful receive power of the $i^{th}$ receive channel indicates a receive power, which is occupied by the $i^{th}$ signal, in the total receive power of the $i^{th}$ receive channel, and the receive power required by the $i^{th}$ receive channel is determined by the receive end according to the channel matrix H and a receive power that is required by single-channel communication.

S430: Adjust a transmit power of the $i^{th}$ signal according to the power adjustment message.

In a multichannel system, a transmit end sends N signals to a receive end through N transmit channels, where an $i^{th}$ signal in the N signals is sent on an $i^{th}$ transmit channel in the N transmit channels, and each signal in the N signals includes a channel estimation sequence. The receive end determines a total receive power of an $i^{th}$ receive channel in N receive channels, determines a channel matrix H according to a received channel estimation sequence, then determines a useful receive power of the $i^{th}$ receive channel according to the channel matrix H and the total receive power of the $i^{th}$ receive channel, and at the same time determines, according to the channel matrix H and a receive power that is required by single-channel communication, a receive power required by the $i^{th}$ receive channel. When the useful receive power of the $i^{th}$ receive channel does not match the receive power required by the $i^{th}$ receive channel, the receive end sends a power adjustment message to the transmit end. The transmit end receives the power adjustment message, and adjusts a transmit power of the $i^{th}$ signal according to the power adjustment message. The power adjustment message is determined according to the useful receive power of the $i^{th}$ receive channel, and therefore a receive power requirement of a useful signal can be met by adjusting a power according to the power adjustment message, and the impact of fading variation in a multichannel system on system performance can be reduced.

According to the method for controlling a transmit power in a multichannel system in this embodiment of the present invention, a transmit power of a signal is adjusted according to a power adjustment message that is sent by a receive end based on a useful receive power, so that a receive power requirement of a useful signal can be met, and the impact of fading variation in a multichannel system on system performance can be reduced.

In this embodiment of the present invention, optionally, as shown in FIG. 5, S430 includes:

S431: if the power adjustment message carries a request for increasing a transmit power, increase the transmit power of the $i^{th}$ signal according to the request for increasing a transmit power, where the power adjustment message is sent by the receive end when the useful receive power of the $i^{th}$ receive channel is less than the receive power required by the $i^{th}$ receive channel; or S432: if the power adjustment message carries a request for reducing a transmit power, reduce the transmit power of the $i^{th}$ signal according to the request for reducing a transmit power, where the power adjustment message is sent by the receive end when the useful receive power of the $i^{th}$ receive channel is greater than the receive power required by the $i^{th}$ receive channel.

Optionally, the transmit end may adjust (increase or reduce) the transmit power of the $i^{th}$ signal according to a certain step $\Delta P$, for example, according to the following equation:

$$P_{tx}^{i}(t+1)=P_{tx}^{i}(t)+\Delta P.$$

When the transmit power is to be increased, $\Delta P$ is a positive value; and when the transmit power is to be reduced, $\Delta P$ is a negative value. The transmit end sends a signal according to an adjusted transmit power $P_{tx}^{i}(t+1)$.

The transmit end may also adjust the transmit power in another manner. For example, the power adjustment message sent by the receive end to the transmit end includes a value that needs to be adjusted (which may be a difference between $P_{rx}^{i}(t)$ and $P_{thr}$), and the transmit end adjusts the transmit power according to the value that needs to be adjusted. In this embodiment of the present invention, a manner for adjusting the transmit power by the transmit end is not limited.

In this embodiment of the present invention, optionally, the useful receive power of the $i^{th}$ receive channel is determined by the receive end according to the following equation:

$$P_{rx}^{i}(t)=P_{total}^{i}(t) \cdot R_i,$$

where $P_{rx}^i(t)$ represents the useful receive power of the $i^{th}$ receive channel, $P_{total}^i(t)$ represents the total receive power of the $i^{th}$ receive channel, $R_i$ represents a proportion of the $i^{th}$ signal to a receive signal of the $i^{th}$ receive channel, and $$R_i = \frac{|h_{ii}|^2}{\sum_{j=1}^{N}|h_{ij}|^2},$$

where $h_{ii}$ and $h_{ij}$ are corresponding elements in the channel matrix H, and $$H = \begin{bmatrix} h_{11} & h_{12} & \ldots & h_{1N} \\ h_{21} & h_{22} & \ldots & h_{2N} \\ \ldots & \ldots & \ldots & \ldots \\ h_{N1} & h_{N2} & \ldots & h_{NN} \end{bmatrix}.$$

In this embodiment of the present invention, optionally, the receive power required by the $i^{th}$ receive channel is determined by the receive end according to the following equation:

$$P_{thr} = P_{SISO} + P_M,$$

where $P_{thr}$ represents the receive power required by the $i^{th}$ receive channel, $P_{SISO}$ represents the receive power required by the single-channel communication, and $P_M$ represents a required power margin corresponding to a condition number cond(H) of the channel matrix H.

It should be understood that, in this embodiment of the present invention, interaction between the receive end and the transmit end, related characteristics, and functions that are described from the side of the receive end correspond to those described from the side of the transmit end, and are not described herein again for clarity.

According to the method for controlling a transmit power in a multichannel system in this embodiment of the present invention, a transmit power of a signal is adjusted according to a power adjustment message that is sent by a receive end based on a useful receive power, so that a receive power requirement of a useful signal can be met, the impact of fading variation in a multichannel system on system performance can be reduced, and interference with a neighboring system is reduced.

It should be understood that, in the embodiments of the present invention, sequence numbers of the foregoing processes do not indicate an execution sequence; and the execution sequence of the processes should be determined according to functions and internal logic of the processes, but should not constitute any limitation to implementation processes of the embodiments of the present invention.

The method for controlling a transmit power in a multichannel system according to the embodiments of the present invention is described above in detail, and a receive end and a transmit end according to the embodiments of the present invention are described in the following.

FIG. 6 is a schematic block diagram of a receive end 600 according to an embodiment of the present invention. As shown in FIG. 6, the receive end 600 includes:

a receiving module 610, configured to receive, through N receive channels, N signals sent by a transmit end, where an $i^{th}$ signal in the N signals is sent on an $i^{th}$ transmit channel in N transmit channels by the transmit end, each signal in the N signals includes a channel estimation sequence, N is a positive integer, N≥2, and i=1, 2, ..., N;

a determining module 620, configured to determine a total receive power of an $i^{th}$ receive channel in the N receive channels, determine a channel matrix H according to a received channel estimation sequence, determine a useful receive power of the $i^{th}$ receive channel according to the channel matrix H and the total receive power of the $i^{th}$ receive channel, where the useful receive power of the $i^{th}$ receive channel indicates a receive power, which is occupied by the $i^{th}$ signal, in the total receive power of the $i^{th}$ receive channel, and determine, according to the channel matrix H and a receive power that is required by single-channel communication, a receive power required by the $i^{th}$ receive channel; and a sending module 630, configured to send a power adjustment message to the transmit end when the useful receive power of the $i^{th}$ receive channel does not match the receive power required by the $i^{th}$ receive channel, so that the transmit end adjusts a transmit power of the $i^{th}$ signal according to the power adjustment message.

In a multichannel system, a transmit end sends N signals to a receive end 600 through N transmit channels, where an $i^{th}$ signal in the N signals is sent on an $i^{th}$ transmit channel in the N transmit channels, and each signal in the N signals includes a channel estimation sequence. A receiving module 610 of the receive end 600 receives, through N receive channels, the N signals sent by the transmit end; a determining module 620 determines a total receive power of an $i^{th}$ receive channel in the N receive channels, determines a channel matrix H according to a received channel estimation sequence, determines a useful receive power of the $i^{th}$ receive channel according to the channel matrix H and the total receive power of the $i^{th}$ receive channel, and determines, according to the channel matrix H and a receive power that is required by single-channel communication, a receive power required by the $i^{th}$ receive channel; and a sending module 630 sends a power adjustment message to the transmit end when the useful receive power of the $i^{th}$ receive channel does not match the receive power required by the $i^{th}$ receive channel. The transmit end adjusts a transmit power of the $i^{th}$ signal according to the power adjustment message. The power adjustment message is determined according to the useful receive power of the $i^{th}$ receive channel, and therefore a receive power requirement of a useful signal can be met by adjusting power according to the power adjustment message, and the impact of fading variation in the multichannel system on system performance can be reduced.

According to the receive end in this embodiment of the present invention, a useful receive power of an $i^{th}$ receive channel is determined according to a channel matrix, and a power adjustment message to be sent to a transmit end is determined according to the useful receive power of the $i^{th}$ receive channel, so that a receive power requirement of a useful signal can be met, and the impact of fading variation in a multichannel system on system performance can be reduced.

In this embodiment of the present invention, optionally, the sending module 630 is specifically configured to, send the power adjustment message to the transmit end when the useful receive power of the $i^{th}$ receive channel is less than the receive power required by the $i^{th}$ receive channel, where the power adjustment message carries a request for increasing a transmit power, so that the transmit end increases the transmit power of the $i^{th}$ signal according to the request for increasing a transmit power.

In this embodiment of the present invention, optionally, the sending module 630 is specifically configured to, send the power adjustment message to the transmit end when the useful receive power of the $i^{th}$ receive channel is greater than the receive power required by the $i^{th}$ receive channel, where the power adjustment message carries a request for reducing a transmit power, so that the transmit end reduces the transmit power of the $i^{th}$ signal according to the request for reducing a transmit power.

In this embodiment of the present invention, optionally, the sending module 630 is further configured to skip sending the power adjustment message to the transmit end when the useful receive power of the $i^{th}$ receive channel matches the receive power required by the $i^{th}$ receive channel.

In this embodiment of the present invention, optionally, the determining module 620 is specifically configured to determine the useful receive power $P_{rx}^{i}(t)$ of the $i^{th}$ receive channel according to the following equation:

$$P_{rx}^{i}(t) = P_{total}^{i}(t) \cdot R_i,$$

where $P_{total}^{i}(t)$ represents the total receive power of the $i^{th}$ receive channel, $R_i$ represents a proportion of the $i^{th}$ signal to a receive signal of the $i^{th}$ receive channel, and $$R_i = \frac{|h_{ii}|^2}{\sum_{j=1}^{N} |h_{ij}|^2},$$

where $h_{ii}$ and $h_{ij}$ are corresponding elements in the channel matrix H, and $$H = \begin{bmatrix} h_{11} & h_{12} & \ldots & h_{1N} \\ h_{21} & h_{22} & \ldots & h_{2N} \\ \ldots & \ldots & \ldots & \ldots \\ h_{N1} & h_{N2} & \ldots & h_{NN} \end{bmatrix}.$$

In this embodiment of the present invention, optionally, the determining module 620 is specifically configured to determine a condition number cond(H) of the channel matrix H according to the channel matrix H, determine a required power margin $P_M$ corresponding to the condition number cond(H) of the channel matrix H, and determine, according to the following equation, the receive power $P_{thr}$ required by the $i^{th}$ receive channel:

$$P_{thr} = P_{SISO} + P_M,$$

where $P_{SISO}$ represents the receive power required by the single-channel communication.

The receive end 600 according to this embodiment of the present invention may correspond to the receive end in the method for controlling a transmit power in a multichannel system according to the embodiments of the present invention, and the foregoing and other operations and/or functions of modules in the receive end 600 each are used for implementing corresponding processes of the methods shown in FIG. 1 to FIG. 5, and are not described herein again for brevity.

According to the receive end in this embodiment of the present invention, whether a power needs to be adjusted is determined according to a useful receive power, so that a receive power requirement of a useful signal can be met, the impact of fading variation in a multichannel system on system performance can be reduced, and interference with a neighboring system is reduced.

FIG. 7 is a schematic block diagram of a transmit end 700 according to an embodiment of the present invention. As shown in FIG. 7, the transmit end 700 includes:

a sending module 710, configured to send N signals to a receive end through N transmit channels, where an $i^{th}$ signal in the N signals is sent on an $i^{th}$ transmit channel in the N transmit channels, and each signal in the N signals includes a channel estimation sequence, so that the receive end determines a total receive power of an $i^{th}$ receive channel in N receive channels, and determines a channel matrix H according to a received channel estimation sequence, where N is a positive integer, N≥2, and i=1, 2, . . . , N;

a receiving module 720, configured to receive a power adjustment message that is sent by the receive end when a useful receive power of the $i^{th}$ receive channel does not match a receive power required by the $i^{th}$ receive channel, where the useful receive power of the $i^{th}$ receive channel is determined by the receive end according to the channel matrix H and the total receive power of the $i^{th}$ receive channel, the useful receive power of the $i^{th}$ receive channel indicates a receive power, which is occupied by the $i^{th}$ signal, in the total receive power of the $i^{th}$ receive channel, and the receive power required by the $i^{th}$ receive channel is determined by the receive end according to the channel matrix H and a receive power that is required by single-channel communication; and an adjusting module 730, configured to adjust a transmit power of the $i^{th}$ signal according to the power adjustment message.

According to the transmit end in this embodiment of the present invention, a transmit power of a signal is adjusted according to a power adjustment message that is sent by a receive end based on a useful receive power, so that a receive power requirement of a useful signal can be met, and the impact of fading variation in a multichannel system on system performance can be reduced.

In this embodiment of the present invention, optionally, the adjusting module 730 is specifically configured to, if the power adjustment message carries a request for increasing a transmit power, increase the transmit power of the $i^{th}$ signal according to the request for increasing a transmit power, where the power adjustment message is sent by the receive end when the useful receive power of the $i^{th}$ receive channel is less than the receive power required by the $i^{th}$ receive channel.

In this embodiment of the present invention, optionally, the adjusting module 730 is specifically configured to, if the power adjustment message carries a request for reducing a transmit power, reduce the transmit power of the $i^{th}$ signal according to the request for reducing a transmit power, where the power adjustment message is sent by the receive end when the useful receive power of the $i^{th}$ receive channel is greater than the receive power required by the $i^{th}$ receive channel.

In this embodiment of the present invention, optionally, the useful receive power of the $i^{th}$ receive channel is determined by the receive end according to the following equation:

$$P_{rx}^{i}(t) = P_{total}^{i}(t) \cdot R_i,$$

where $P_{rx}^{i}(t)$ represents the useful receive power of the $i^{th}$ receive channel, $P_{total}^{i}(t)$ represents the total receive power of the $i^{th}$ receive channel, $R_i$ a proportion of the $i^{th}$ signal to a receive signal of the $i^{th}$ receive channel, and $$R_i = \frac{|h_{ii}|^2}{\sum_{j=1}^{N} |h_{ij}|^2},$$

where $h_{ii}$, $h_{ij}$ and $h_{ij}$ are corresponding elements in the channel matrix H, and $$H = \begin{bmatrix} h_{11} & h_{12} & \ldots & h_{1N} \\ h_{21} & h_{22} & \ldots & h_{2N} \\ \ldots & \ldots & \ldots & \ldots \\ h_{N1} & h_{N2} & \ldots & h_{NN} \end{bmatrix}.$$

In this embodiment of the present invention, optionally, the receive power required by the $i^{th}$ receive channel is determined by the receive end according to the following equation:

$$P_{thr} = P_{SISO} + P_M,$$

where $P_{thr}$ represents the receive power required by the $i^{th}$ receive channel, $P_{SISO}$ represents the receive power required by the single-channel communication, and $P_M$ represents a required power margin corresponding to a condition number cond(H) of the channel matrix H.

The transmit end 700 according to this embodiment of the present invention may correspond to the transmit end in the method for controlling a transmit power in a multichannel system according to the embodiments of the present invention, and the foregoing and other operations and/or functions of modules in the transmit end 700 each are used for implementing corresponding processes of the methods shown in FIG. 1 to FIG. 5, and are not described herein again for brevity.

According to the transmit end in this embodiment of the present invention, a transmit power of a signal is adjusted according to a power adjustment message that is sent by a receive end based on a useful receive power, so that a receive power requirement of a useful signal can be met, the impact of fading variation in a multichannel system on system performance can be reduced, and interference with a neighboring system is reduced.

Figure 8:
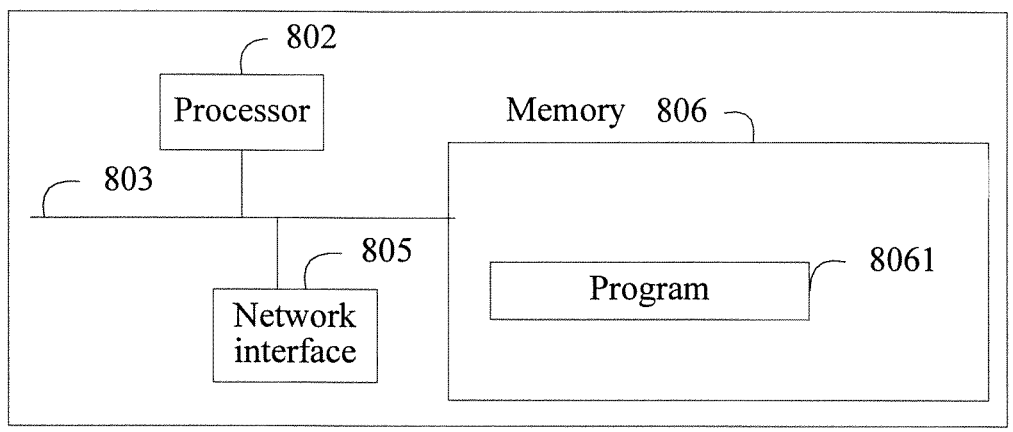
FIG. 8 is a schematic structural diagram of a receive end according to an embodiment of the present invention.

FIG. 8 shows a structure of a receive end according to another embodiment of the present invention, and the receive end includes at least one processor 802 (for example, a CPU), at least one network interface 805 or other communications interfaces, a memory 806, and at least one communications bus 803, configured to implement connection and communication among these apparatuses. The processor 802 is configured to execute an executable module stored in the memory 806, for example, a computer program. The memory 806 may include a high speed random access memory (RAM: Random Access Memory), or may include a non-volatile memory (non-volatile memory), for example, at least one disk memory. A communication connection between the at least one network interface 805 (which may be wired or wireless) and at least one another network element is implemented by using the Internet, a wide area network, a local area network, a metropolitan area network, and the like.

In some implementation manners, the memory 806 stores a program 8061, and the program 8061 may be executed by the processor 802. The program includes:

receiving, through N receive channels, N signals sent by a transmit end, where an $i^{th}$ signal in the N signals is sent on an $i^{th}$ transmit channel in N transmit channels by the transmit end, each signal in the N signals includes a channel estimation sequence, N is a positive integer, N≥2, and i=1, 2, ..., N;

determining a total receive power of an $i^{th}$ receive channel in the N receive channels;

determining a channel matrix H according to a received channel estimation sequence;

determining a useful receive power of the $i^{th}$ receive channel according to the channel matrix H and the total receive power of the $i^{th}$ receive channel, where the useful receive power of the $i^{th}$ receive channel indicates a receive power, which is occupied by the $i^{th}$ signal, in the total receive power of the $i^{th}$ receive channel;

determining, according to the channel matrix H and a receive power that is required by single-channel communication, a receive power required by the $i^{th}$ receive channel; and sending a power adjustment message to the transmit end if the useful receive power of the $i^{th}$ receive channel does not match the receive power required by the $i^{th}$ receive channel, so that the transmit end adjusts a transmit power of the $i^{th}$ signal according to the power adjustment message.

Optionally, the sending a power adjustment message to the transmit end if the useful receive power of the $i^{th}$ receive channel does not match the receive power required by the $i^{th}$ receive channel includes:

sending the power adjustment message to the transmit end if the useful receive power of the $i^{th}$ receive channel is less than the receive power required by the $i^{th}$ receive channel, where the power adjustment message carries a request for increasing a transmit power, so that the transmit end increases the transmit power of the $i^{th}$ signal according to the request for increasing a transmit power; or sending the power adjustment message to the transmit end if the useful receive power of the $i^{th}$ receive channel is greater than the receive power required by the $i^{th}$ receive channel, where the power adjustment message carries a request for reducing a transmit power, so that the transmit end reduces the transmit power of the $i^{th}$ signal according to the request for reducing a transmit power.

Optionally, the program further includes:

skipping sending the power adjustment message to the transmit end if the useful receive power of the $i^{th}$ receive channel matches the receive power required by the $i^{th}$ receive channel.

Optionally, the determining a useful receive power of the $i^{th}$ receive channel according to the channel matrix H and the total receive power of the $i^{th}$ receive channel includes:

determining the useful receive power $P_{rx}^{i}(t)$ of the $i^{th}$ receive channel according to the following equation:

$$P_{rx}^{i}(t) = P_{total}^{i}(t) \cdot R_i,$$

where $P_{total}^{i}(t)$ represents the total receive power of the $i^{th}$ receive channel, $R_i$ represents a proportion of the $i^{th}$ signal to a receive signal of the $i^{th}$ receive channel, and $$R_i = \frac{|h_{ii}|^2}{\sum_{j=1}^{N} |h_{ij}|^2},$$

where $h_{ii}$ and $h_{ij}$ are corresponding elements in the channel matrix H, and $$H = \begin{bmatrix} h_{11} & h_{12} & \ldots & h_{1N} \\ h_{21} & h_{22} & \ldots & h_{2N} \\ \ldots & \ldots & \ldots & \ldots \\ h_{N1} & h_{N2} & \ldots & h_{NN} \end{bmatrix}.$$

Optionally, the determining, according to the channel matrix H and a receive power that is required by single-channel communication, a receive power required by the $i^{th}$ receive channel includes:

determining a condition number cond(H) of the channel matrix H according to the channel matrix H;

determining a required power margin $P_M$ corresponding to the condition number cond(H) of the channel matrix H; and determining, according to the following equation, the receive power $P_{thr}$ required by the $i^{th}$ receive channel:

$$P_{thr} = P_{SISO} + P_M,$$

where $P_{SISO}$ represents the receive power required by the single-channel communication.

It can be seen from the foregoing technical solutions provided in the embodiments of the present invention that, in this embodiment of the present invention, a useful receive power of an $i^{th}$ receive channel is determined according to a channel matrix, and a power adjustment message to be sent to a transmit end is determined according to the useful receive power of the $i^{th}$ receive channel, so that a receive power requirement of a useful signal can be met, and the impact of fading variation in a multichannel system on system performance can be reduced.

Figure 9:
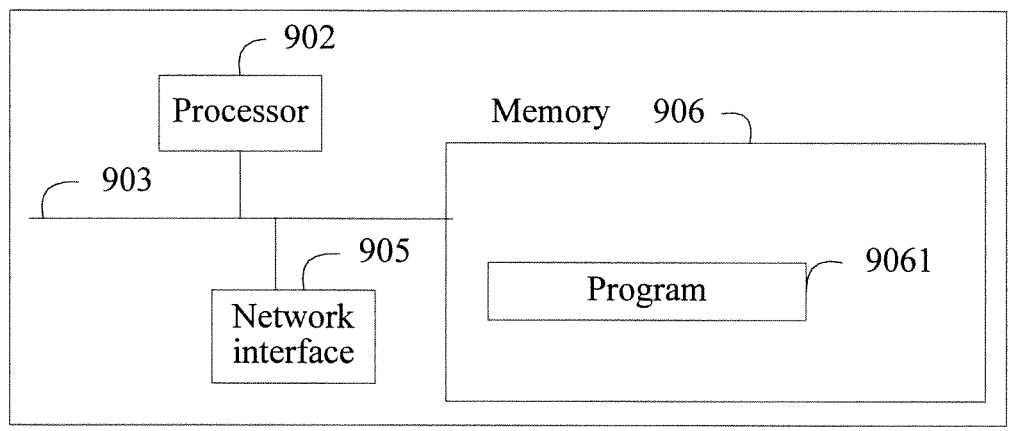
FIG. 9 is a schematic structural diagram of a transmit end according to an embodiment of the present invention.

FIG. 9 shows a structure of a transmit end according to another embodiment of the present invention, and the transmit end includes at least one processor 902 (for example, a CPU), at least one network interface 905 or other communications interfaces, a memory 906, and at least one communications bus 903, configured to implement connection and communication among these apparatuses. The processor 902 is configured to execute an executable module stored in the memory 906, for example, a computer program. The memory 906 may include a high speed random access memory (RAM: Random Access Memory), or may include a non-volatile memory (non-volatile memory), for example, at least one disk memory. A communication connection between the at least one network interface 905 (which may be wired or wireless) and at least one another network element is implemented by using the Internet, a wide area network, a local area network, a metropolitan area network, and the like.

In some implementation manners, the memory 906 stores a program 9061, and the program 9061 may be executed by the processor 902. The program includes:

sending N signals to a receive end through N transmit channels, where an $i^{th}$ signal in the N signals is sent on an $i^{th}$ transmit channel in the N transmit channels, and each signal in the N signals includes a channel estimation sequence, so that the receive end determines a total receive power of an $i^{th}$ receive channel in N receive channels, and determines a channel matrix H according to a received channel estimation sequence, where N is a positive integer, N≥2, and i=1, 2, ..., N;

receiving a power adjustment message that is sent by the receive end when a useful receive power of the $i^{th}$ receive channel does not match a receive power required by the $i^{th}$ receive channel, where the useful receive power of the $i^{th}$ receive channel is determined by the receive end according to the channel matrix H and the total receive power of the $i^{th}$ receive channel, the useful receive power of the $i^{th}$ receive channel indicates a receive power, which is occupied by the $i^{th}$ signal, in the total receive power of the $i^{th}$ receive channel, and the receive power required by the $i^{th}$ receive channel is determined by the receive end according to the channel matrix H and a receive power that is required by single-channel communication; and adjusting a transmit power of the $i^{th}$ signal according to the power adjustment message.

Optionally, the adjusting a transmit power of the $i^{th}$ signal according to the power adjustment message includes:

if the power adjustment message carries a request for increasing a transmit power, increasing the transmit power of the $i^{th}$ signal according to the request for increasing a transmit power, where the power adjustment message is sent by the receive end when the useful receive power of the $i^{th}$ receive channel is less than the receive power required by the $i^{th}$ receive channel; or if the power adjustment message carries a request for reducing a transmit power, reducing the transmit power of the $i^{th}$ signal according to the request for reducing a transmit power, where the power adjustment message is sent by the receive end when the useful receive power of the $i^{th}$ receive channel is greater than the receive power required by the $i^{th}$ receive channel.

Optionally, the useful receive power of the $i^{th}$ receive channel is determined by the receive end according to the following equation:

$$P_{rx}^{i}(t) = P_{total}^{i}(t) \cdot R^{i},$$

where $P_{rx}^{i}(t)$ represents the useful receive power of the $i^{th}$ receive channel, $P_{total}^{i}(t)$ represents the total receive power of the $i^{th}$ receive channel, $R_i$ a proportion of the $i^{th}$ signal to a receive signal of the $i^{th}$ receive channel, and $$R_i = \frac{|h_{ii}|^2}{\sum_{j=1}^{N} |h_{ij}|^2},$$

where $h_{ii}$ and $h_{ij}$ are corresponding elements in the channel matrix H, and $$H = \begin{bmatrix} h_{11} & h_{12} & \ldots & h_{1N} \\ h_{21} & h_{22} & \ldots & h_{2N} \\ \ldots & \ldots & \ldots & \ldots \\ h_{N1} & h_{N2} & \ldots & h_{NN} \end{bmatrix}.$$

Optionally, the receive power required by the $i^{th}$ receive channel is determined by the receive end according to the following equation:

$$P_{thr} = P_{SISO} + P_M,$$

where $P_{thr}$ represents the receive power required by the $i^{th}$ receive channel, $P_{SISO}$ represents the receive power required by the single-channel communication, and $P_M$ represents a required power margin corresponding to a condition number cond(H) of the channel matrix H.

It can be seen from the foregoing technical solutions provided in the embodiments of the present invention that, in this embodiment of the present invention, a transmit power of a signal is adjusted according to a power adjustment message that is sent by a receive end based on a useful receive power, so that a receive power requirement of a useful signal can be met, and the impact of fading variation in a multichannel system on system performance can be reduced.

It should be understood that, the term "and/or" in the embodiments of the present invention describes only an association relationship for describing associated objects and represents that three relationships may exist. For example, A and/or B may represent the following three cases: Only A exists, both A and B exist, and only B exists. In addition, the symbol "/" in this specification generally indicates that associated objects before and after the symbol are in an "or" relationship.

A person of ordinary skill in the art may be aware that, in combination with the examples described in the embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that such implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts shown as units may or may not be physical units, may be located in one position, or may be distributed on multiple network units. Some or all of the units may be selected according to actual needs to achieve the objectives of the solutions in the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) to pertain all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for controlling a transmit power in a multi-channel system, the method comprising:

receiving, through N receive channels, N signals sent by a transmit end, wherein an $i^{th}$ signal in the N signals is sent on an $i^{th}$ transmit channel in N transmit channels by the transmit end, each signal in the N signals comprises a channel estimation sequence, N is a positive integer, N≥2, and i=1, 2, . . . , N;

determining a total receive power of an $i^{th}$ receive channel in the N receive channels;

determining a channel matrix H according to a received channel estimation sequence;

determining a useful receive power of the $i^{th}$ receive channel according to the channel matrix H and the total receive power of the $i^{th}$ receive channel, wherein the useful receive power of the $i^{th}$ receive channel indicates a receive power, which is occupied by the $i^{th}$ signal, in the total receive power of the $i^{th}$ receive channel;

determining, according to the channel matrix H and a receive power that is required by single-channel communication, a receive power required by the $i^{th}$ receive channel; and sending a power adjustment message to the transmit end if the useful receive power of the $i^{th}$ receive channel does not match the receive power required by the $i^{th}$ receive channel, so that the transmit end adjusts a transmit power of the $i^{th}$ signal according to the power adjustment message.

2. The method according to claim 1, wherein sending a power adjustment message to the transmit end if the useful receive power of the $i^{th}$ receive channel does not match the receive power required by the $i^{th}$ receive channel comprises:

sending the power adjustment message to the transmit end if the useful receive power of the $i^{th}$ receive channel is less than the receive power required by the $i^{th}$ receive channel, wherein the power adjustment message carries a request for increasing a transmit power, so that the transmit end increases the transmit power of the $i^{th}$ signal according to the request for increasing a transmit power; or sending the power adjustment message to the transmit end if the useful receive power of the $i^{th}$ receive channel is greater than the receive power required by the $i^{th}$ receive channel, wherein the power adjustment message carries a request for reducing a transmit power, so that the transmit end reduces the transmit power of the $i^{th}$ signal according to the request for reducing a transmit power.

3. The method according to claim 1, wherein the method further comprises:
skipping sending the power adjustment message to the transmit end if the useful receive power of the $i^{th}$ receive channel matches the receive power required by the $i^{th}$ receive channel.

4. The method according to claim 1, wherein determining a useful receive power of the $i^{th}$ receive channel according to the channel matrix H and the total receive power of the $i^{th}$ receive channel comprises:
determining the useful receive power $P_{rx}^{i}(t)$ of the $i^{th}$ receive channel according to the following equation:

$$P_{rx}^{i}(t) = P_{total}^{i}(t) \cdot R_i,$$

wherein $P_{rx}^{i}(t)$ represents the total receive power of the $i^{th}$ receive channel, $R_i$ represents a proportion of the $i^{th}$ signal to a receive signal of the $i^{th}$ receive channel, and $$R_i = \frac{|h_{ii}|^2}{\sum_{j=1}^{N} |h_{ij}|^2},$$

wherein $h_{ii}$ and $h_{ij}$ are corresponding elements in the channel matrix H, and $$H = \begin{bmatrix} h_{11} & h_{12} & \ldots & h_{1N} \\ h_{21} & h_{22} & \ldots & h_{2N} \\ \ldots & \ldots & \ldots & \ldots \\ h_{N1} & h_{N2} & \ldots & h_{NN} \end{bmatrix}.$$

5. The method according to claim 1, wherein determining, according to the channel matrix H and a receive power that is required by single-channel communication, a receive power required by the $i^{th}$ receive channel comprises:
determining a condition number cond(H) of the channel matrix H according to the channel matrix H;
determining a required power margin $P_M$ corresponding to the condition number cond(H) of the channel matrix H; and
determining, according to the following equation, the receive power $P_{thr}$ required by the $i^{th}$ receive channel:

$$P_{thr} = P_{SISO} + P_M,$$

wherein $P_{SISO}$ represents the receive power required by the single-channel communication.

6. A method for controlling a transmit power in a multi-channel system, the method comprising:
sending N signals to a receive end through N transmit channels, wherein an $i^{th}$ signal in the N signals is sent on an $i^{th}$ transmit channel in the N transmit channels, and each signal in the N signals comprises a channel estimation sequence, so that the receive end determines a total receive power of an $i^{th}$ receive channel in N receive channels, and determines a channel matrix H according to a received channel estimation sequence, wherein N is a positive integer, N≥2, and i=1, 2, ..., N;
receiving a power adjustment message that is sent by the receive end when a useful receive power of the $i^{th}$ receive channel does not match a receive power required by the $i^{th}$ receive channel, wherein the useful receive power of the $i^{th}$ receive channel is determined by the receive end according to the channel matrix H and the total receive power of the $i^{th}$ receive channel, the useful receive power of the $i^{th}$ receive channel indicates a receive power, which is occupied by the $i^{th}$ signal, in the total receive power of the $i^{th}$ receive channel, and the receive power required by the $i^{th}$ receive channel is determined by the receive end according to the channel matrix H and a receive power that is required by single-channel communication; and
adjusting a transmit power of the $i^{th}$ signal according to the power adjustment message.

7. The method according to claim 6, wherein adjusting a transmit power of the $i^{th}$ signal according to the power adjustment message comprises:
if the power adjustment message carries a request for increasing a transmit power, increasing the transmit power of the $i^{th}$ signal according to the request for increasing a transmit power, wherein the power adjustment message is sent by the receive end when the useful receive power of the $i^{th}$ receive channel is less than the receive power required by the $i^{th}$ receive channel; or
if the power adjustment message carries a request for reducing a transmit power, reducing the transmit power of the $i^{th}$ signal according to the request for reducing a transmit power, wherein the power adjustment message is sent by the receive end when the useful receive power of the $i^{th}$ receive channel is greater than the receive power required by the $i^{th}$ receive channel.

8. The method according to claim 6, wherein the useful receive power of the $i^{th}$ receive channel is determined by the receive end according to the following equation:

$$P_{rx}^{i}(t) = P_{total}^{i}(t) \cdot R_i,$$

wherein $P_{rx}^{i}(t)$ represents the useful receive power of the $i^{th}$ receive channel, $P_{total}^{i}(t)$ represents the total receive power of the $i^{th}$ receive channel, $R_i$ represents a proportion of the $i^{th}$ signal to a receive signal of the $i^{th}$ receive channel, and $$R_i = \frac{|h_{ii}|^2}{\sum_{j=1}^{N} |h_{ij}|^2},$$

wherein $h_{ii}$ and $h_{ij}$ are corresponding elements in the channel matrix H, and $$H = \begin{bmatrix} h_{11} & h_{12} & \ldots & h_{1N} \\ h_{21} & h_{22} & \ldots & h_{2N} \\ \ldots & \ldots & \ldots & \ldots \\ h_{N1} & h_{N2} & \ldots & h_{NN} \end{bmatrix}.$$

9. The method according to claim 6, wherein the receive power required by the $i^{th}$ receive channel is determined by the receive end according to the following equation:

$$P_{thr} = P_{SISO} + P_M,$$

wherein $P_{thr}$ represents the receive power required by the $i^{th}$ receive channel, $P_{SISO}$ represents the receive power required by the single-channel communication, and $P_M$ represents a required power margin corresponding to a condition number cond(H) of the channel matrix H.

10. A receive end, comprising:
a receiving module, configured to receive, through N receive channels, N signals sent by a transmit end, wherein an $i^{th}$ signal in the N signals is sent on an $i^{th}$ transmit channel in N transmit channels by the transmit end, each signal in the N signals comprises a channel estimation sequence, N is a positive integer, N≥2, and i=1, 2, . . . , N;
a determining module, configured to determine a total receive power of an $i^{th}$ receive channel in the N receive channels, determine a channel matrix H according to a received channel estimation sequence, determine a useful receive power of the $i^{th}$ receive channel according to the channel matrix H and the total receive power of the $i^{th}$ receive channel, wherein the useful receive power of the $i^{th}$ receive channel indicates a receive power, which is occupied by the $i^{th}$ signal, in the total receive power of the $i^{th}$ receive channel, and determine, according to the channel matrix H and a receive power that is required by single-channel communication, a receive power required by the $i^{th}$ receive channel; and
a sending module, configured to send a power adjustment message to the transmit end when the useful receive power of the $i^{th}$ receive channel does not match the receive power required by the $i^{th}$ receive channel, so that the transmit end adjusts a transmit power of the $i^{th}$ signal according to the power adjustment message.

11. The receive end according to claim 10, wherein the sending module is configured to,
send the power adjustment message to the transmit end when the useful receive power of the $i^{th}$ receive channel is less than the receive power required by the $i^{th}$ receive channel, wherein the power adjustment message carries a request for increasing a transmit power, so that the transmit end increases the transmit power of the $i^{th}$ signal according to the request for increasing a transmit power; or
send the power adjustment message to the transmit end when the useful receive power of the $i^{th}$ receive channel is greater than the receive power required by the $i^{th}$ receive channel, wherein the power adjustment message carries a request for reducing a transmit power, so that the transmit end reduces the transmit power of the $i^{th}$ signal according to the request for reducing a transmit power.

12. The receive end according to claim 10, wherein the sending module is further configured to skip sending the power adjustment message to the transmit end when the useful receive power of the $i^{th}$ receive channel matches the receive power required by the $i^{th}$ receive channel.

13. The receive end according to claim 10, wherein the determining module is configured to determine the useful receive power $P_{rx}^{i}(t)$ of the $i^{th}$ receive channel according to the following equation:

$$P_{rx}^{i}(t) = P_{total}^{i}(t) \cdot R_i,$$

wherein $P_{total}^{i}(t)$ represents the total receive power of the $i^{th}$ receive channel, $R_i$ represents a proportion of the $i^{th}$ signal to a receive signal of the $i^{th}$ receive channel, and $$R_i = \frac{|h_{ii}|^2}{\sum_{j=1}^{N} |h_{ij}|^2},$$

wherein $h_{ii}$ and $h_{ij}$ are corresponding elements in the channel matrix H, and $$H = \begin{bmatrix} h_{11} & h_{12} & \ldots & h_{1N} \\ h_{21} & h_{22} & \ldots & h_{2N} \\ \ldots & \ldots & \ldots & \ldots \\ h_{N1} & h_{N2} & \ldots & h_{NN} \end{bmatrix}.$$

14. The receive end according to claim 10, wherein the determining module is configured to determine a condition number cond(H) of the channel matrix H according to the channel matrix H, determine a required power margin $P_M$ corresponding to the condition number cond(H) of the channel matrix H, and determine, according to the following equation, the receive power $P_{thr}$ required by the $i^{th}$ receive channel:

$$P_{thr} = P_{SISO} + P_M,$$

wherein $P_{SISO}$ represents the receive power required by the single-channel communication.

15. A transmit end, comprising:
a sending module, configured to send N signals to a receive end through N transmit channels, wherein an $i^{th}$ signal in the N signals is sent on an $i^{th}$ transmit channel in the N transmit channels, and each signal in the N signals comprises a channel estimation sequence, so that the receive end determines a total receive power of an $i^{th}$ receive channel in N receive channels, and determines a channel matrix H according to a received channel estimation sequence, wherein N is a positive integer, N≥2, and i=1, 2, . . . , N;
a receiving module, configured to receive a power adjustment message that is sent by the receive end when a useful receive power of the $i^{th}$ receive channel does not match a receive power required by the $i^{th}$ receive channel, wherein the useful receive power of the $i^{th}$ receive channel is determined by the receive end according to the channel matrix H and the total receive power of the $i^{th}$ receive channel, the useful receive power of the $i^{th}$ receive channel indicates a receive power, which is occupied by the $i^{th}$ signal, in the total receive power of the $i^{th}$ receive channel, and the receive power required by the $i^{th}$ receive channel is determined by the receive end according to the channel matrix H and a receive power that is required by single-channel communication; and
an adjusting module, configured to adjust a transmit power of the $i^{th}$ signal according to the power adjustment message.

16. The transmit end according to claim 15, wherein the adjusting module is configured to,
if the power adjustment message carries a request for increasing a transmit power, increase the transmit power of the signal according to the request for increasing a transmit power, wherein the power adjustment message is sent by the receive end when the useful receive power of the $i^{th}$ receive channel is less than the receive power required by the $i^{th}$ receive channel; or
if the power adjustment message carries a request for reducing a transmit power, reduce the transmit power of the $i^{th}$ signal according to the request for reducing a transmit power, wherein the power adjustment message is sent by the receive end when the useful receive power of the $i^{th}$ receive channel is greater than the receive power required by the $i^{th}$ receive channel.

17. The transmit end according to claim 15, wherein the useful receive power of the $i^{th}$ receive channel is determined by the receive end according to the following equation:

$$P_{rx}^{i}(t)=P_{total}^{i}(t)\cdot R_i,$$

wherein $P_{rx}^{i}(t)$ represents the useful receive power of the $i^{th}$ receive channel, $P_{total}^{i}(t)$ represents the total receive power of the $i^{th}$ receive channel, $R_i$ represents a proportion of the $i^{th}$ signal to a receive signal of the $i^{th}$ receive channel, and $$R_i = \frac{|h_{ii}|^2}{\sum_{j=1}^{N}|h_{ij}|^2},$$

wherein $h_{ii}$ and $h_{ij}$ are corresponding elements in the channel matrix H, and $$H = \begin{bmatrix} h_{11} & h_{12} & \ldots & h_{1N} \\ h_{21} & h_{22} & \ldots & h_{2N} \\ \ldots & \ldots & \ldots & \ldots \\ h_{N1} & h_{N2} & \ldots & h_{NN} \end{bmatrix}.$$

18. The transmit end according to claim 15, wherein the receive power required by the $i^{th}$ receive channel is determined by the receive end according to the following equation:

$$P_{thr}=P_{SISO}+P_M,$$

wherein $P_{thr}$ represents the receive power required by the $i^{th}$ receive channel, $P_{SISO}$ represents the receive power required by the single-channel communication, and $P_M$ represents a required power margin corresponding to a condition number cond(H) of the channel matrix H.

* * * * *